United States Patent [19]
Takeuchi et al.

[11] Patent Number: 5,474,859
[45] Date of Patent: Dec. 12, 1995

[54] ELECTROCHEMICAL CELL DESIGN FOR USE UNDER HIGH SHOCK AND VIBRATION CONDITIONS

[75] Inventors: Esther S. Takeuchi, East Amherst; Michael F. Pyszczek, LeRoy, both of N.Y.

[73] Assignee: Wilson Greatbatch Ltd., Clarence, N.Y.

[21] Appl. No.: 363,382

[22] Filed: Feb. 13, 1995

[51] Int. Cl.[6] .................................................. H01M 2/10
[52] U.S. Cl. ........................ 429/161; 429/181; 429/182; 429/186; 429/211; 29/623.2
[58] Field of Search ..................... 429/161, 181, 429/182, 186, 211; 29/623.2; H01M 2/10

[56] References Cited

U.S. PATENT DOCUMENTS

| | | | |
|---|---|---|---|
| 2,324,185 | 7/1943 | Ambruster | 136/80 |
| 3,565,690 | 2/1971 | Du Plessix et al. | 429/211 |
| 3,625,766 | 12/1971 | Paine | 136/79 |
| 4,452,869 | 6/1984 | DeMoully et al. | 429/94 |
| 4,495,259 | 1/1985 | Uba | 429/161 |
| 4,830,940 | 5/1989 | Keister et al. | 429/194 |
| 5,238,757 | 8/1993 | Suzuki et al. | 429/94 |

*Primary Examiner*—Prince Willis, Jr.
*Assistant Examiner*—Richard H. Lilley, Jr.
*Attorney, Agent, or Firm*—Hodgson, Russ, Andrews, Woods & Goodyear

[57] ABSTRACT

A structure for stabilizing of an electrochemical cell stack against high shock and vibration forces through the use of a plurality of electrode connections at both the top and bottom of the stack is described. Constructing the cell casing having a tubular shape rather than the typical deep drawn can shape, allows access to the lower portion of the stack. There, additional leads are welded to the cell case, which significantly adds to the stability of the stack within the case. The lower portion of the case is then within the case. The lower portion of the case is then hermetically sealed by fitting and welding a disc in place.

17 Claims, 4 Drawing Sheets

ELECTROCHEMICAL CELL DESIGN FOR USE UNDER HIGH SHOCK AND VIBRATION CONDITIONS

BACKGROUND OF THE INVENTION

1. Field of the Invention

The present invention relates generally to the art of electrochemical cells and more particularly to a cell design for use under high shock and vibration conditions.

Electrochemical cells are used frequently in applications where high shock and vibration levels are experienced. A notable example is in the gas and oil industry where "measurement while drilling" applications utilize nonaqueous cells of both solid and liquid cathode chemistries. Preferred are lithium cells. Under high shock and vibration conditions, cells without adequate stabilization are capable of failing due to movement of the cell stack or electrode assembly within the case. This movement can result in the mechanical failure of the electrode leads rendering the cell inoperative or, in the worst case, may produce a short circuit within the cell. In that respect, mechanical stabilization of the electrode assembly inside the cell case is important to improving the reliability and safety of electrochemical cells subjected to high shock and vibration conditions.

The electrochemical cell of the present invention provides such mechanical stabilization through a plurality of tab means electrically connecting at least one of the positive and negative electrodes to the cell casing along and about an axis of anticipated shock and vibration forces. Preferably, there are a sufficient number of tab means to prevent movement of the electrode assembly inside the casing along and about a plurality of axes of anticipated shock and vibration forces.

2. Prior Art

Typical techniques used in the construction of electrochemical cells begin with a deep drawn metal can which is closed at its bottom end. The electrode assembly such as a jellyroll assembly is inserted into the can. Cell fabrication continues with connection of the electrode leads to the cell can and insulated terminal pin on the header. The header is then welded or crimped onto the deep drawn can to complete the basic cell. While this fabrication technique lends itself well to automated manufacturing, it does not allow for any mechanical stabilization of the electrode assembly other than operations performed at the top of the assembly prior to sealing the unit.

U.S. Pat. Nos. 3,625,766 to Purcell, Jr. et al. and 4,495,259 to Uba are both directed to batteries capable of withstanding impact and vibrational forces, however, they also do not provide a multiplicity of conductor tabs at opposed ends of the electrode assembly, as in the present invention. In particular, Purcell, Jr. et al. describes a storage battery comprising a plurality of positive plates and a plurality of negative plates disposed in alternating and parallel relationship. The negative plates are in part held in position by parallel grooves provided in the spaced apart side walls of the housing. Further, the opposite polarity plates are interconnected through a plurality of alternating shims formed of rigid insulating material. The grooves and alternating shims do not function in a similar manner as the plurality of electrode connections of the present invention.

The Uba patent describes an electrode plate support member comprising a comb-like portion having a series of tines interposed between projecting tabs associated with the respective polarity electrode straps. Again, the electrode plate support does not function in a similar manner as the plurality of electrode connections of the present invention.

U.S. Pat. No. 5,238,757 to Suzuki et al. discloses an alkaline storage battery having an upper current collector comprising a circular current collecting tab resistance-welded to the terminal edge of the positive electrode and a rectangular lead connecting between the upper current collector tab and a sealing cover for the battery casing. The negative electrode has a lower current collector comprising a circular collecting tab spot-welded to the terminal edge of the negative electrode and a tongue-shaped lead connected between the lower current collector tab and the bottom of the casing. This construction does not provide for a plurality of electrode connections at opposed ends of the electrode assembly.

U.S. Pat. No. 4,452,869 to DeMoully et al. describes a battery terminal comprising a base portion having an integral tab. When the electrode assembly is inserted into the casing, the outer end of the integral tab is captured between the casing and sidewall of the assembly. If desired, two of these tabs may be attached to one or both ends of the electrode assembly. However, with one of these battery terminals positioned at the upper portion of the sidewall of the electrode assembly, the motion of sliding the assembly in a downwardly direction into the casing will tend to remove the upper tab from its captured relationship.

It is therefore an object of the present invention to provide a multiplicity of electrical tab connections at opposed ends of the electrode assembly and connected to the cell casing. These multiple connections serve to stabilize the electrode assembly within the casing being subjected to stress and vibration forces due to the fact that either the upper or the lower tabs are in tension condition. Thus, by eliminating axial movement of the electrode assembly, the electrical tab connections do not experience compressive loads which can result in tab and cell failure.

These and other objects will become increasingly more apparent to those of ordinary skill in the art by reference to the following descriptions and to the drawings.

SUMMARY OF THE INVENTION

The cell design of the present invention includes a tube-like casing that provides for access therein to enable a multiplicity of connections to be performed on the electrode leads, thus significantly adding to the stability of the electrode assembly inside the casing. Electrode connections are preferably made with metal tabs which connect between the current collector embedded in the electrode assembly and the casing wall. In particular, a plurality of electrode connections are grouped at each "end" of the electrode assembly and connecting to the casing wall along the axis of intended shock and vibration forces. This configuration of electrode connections keeps the cell assembly in a stable position disposed inside the casing since at least one of the groups of electrode connections along the axis of anticipated shock and vibration forces is always in tension. Thus, by eliminating compression loads exerted on the electrode connections, the electrode connections and the electrode assembly are prevented from failing due to metal fatigue.

DETAILED DESCRIPTION OF THE PREFERRED EMBODIMENT

Figure 1:
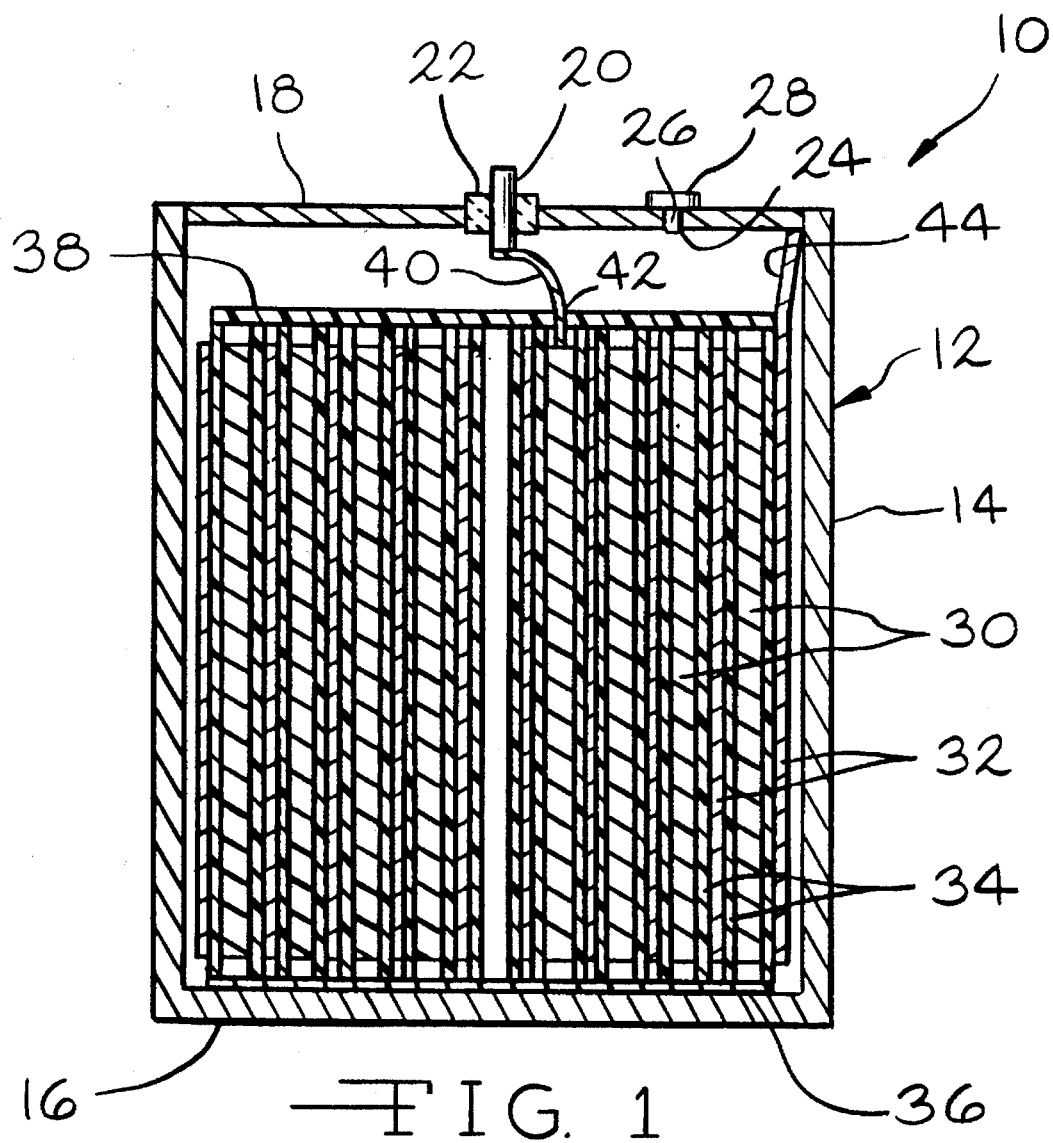
FIG. 1 is an elevational, cross-sectional view of an electrochemical cell 10 fabricated according to conventional practice.
Figure 2:
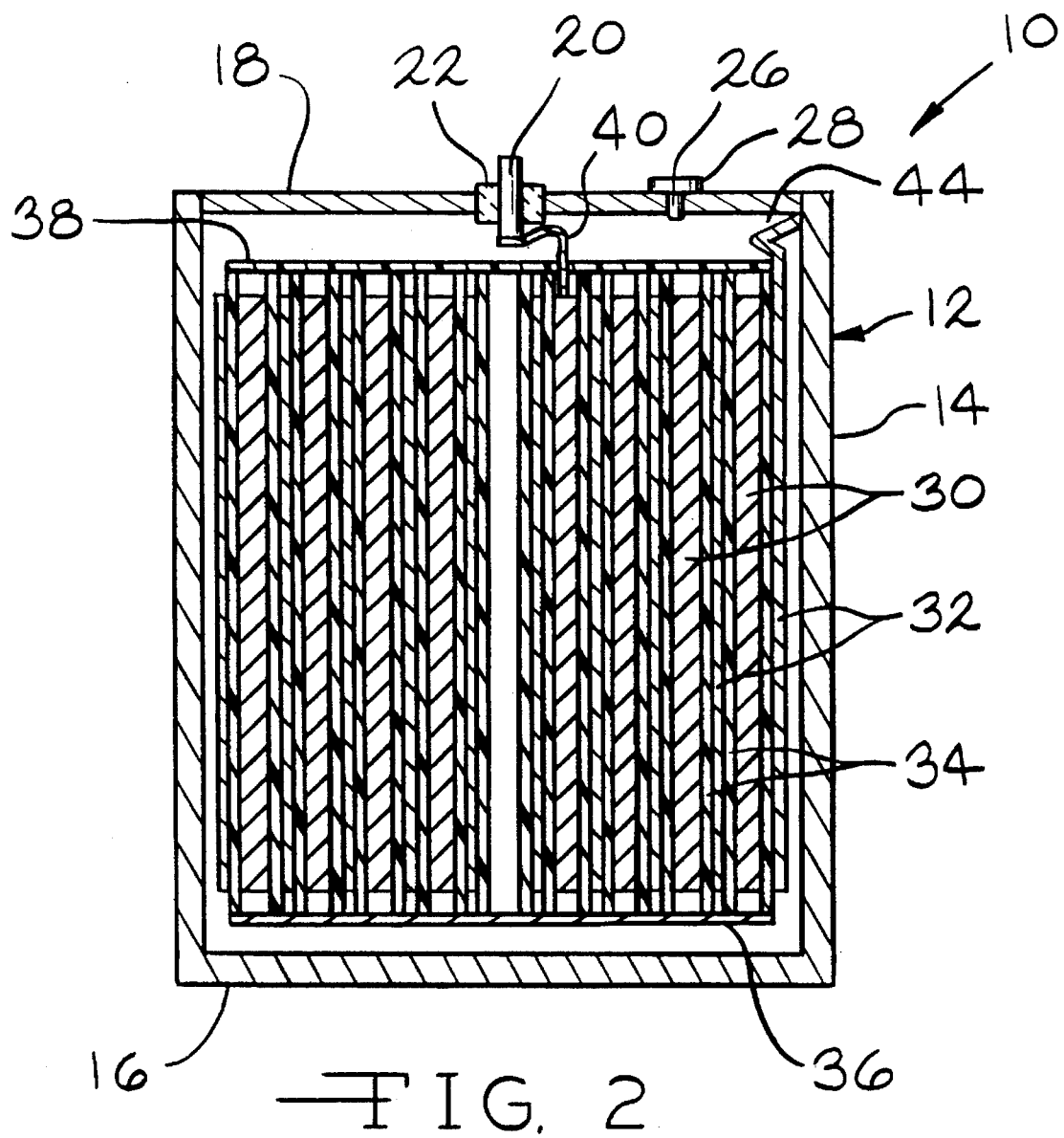
FIG. 2 is an elevational, cross-sectional view of the electrochemical cell 10 shown in FIG. 1 after the cell has

FIGS. 1 and 2 show an exemplary construction of a "spirally wound" electrochemical cell 10 according to conventional practice. Cell 10 includes a hollow casing 12 generally in the form of a deep drawn can having a cylindrically shaped side wall 14 closed at the bottom by an integral end wall 16. Casing 10 is closed at the top by a lid 18 welded in place in a known manner. Casing 10 is made of metal such as stainless steel, and being electrically conductive provides one terminal or contact for making electrical connection between the cell 10 and its load. Lid 18 also is typically made of stainless steel. The other electrical terminal or contact is provided by a conductor or pin 20 extending from within the cell 10 and through casing 12, in particular through lid 18. Pin 20 is insulated electrically from the metal lid 18 by an insulator and seal structure 22. Pin 20 and seal 22 are typically of a corrosion resistant pin-glass combination such as molybdenum and Ta23 glass. An electrolyte fill opening 24 is provided in lib 20 and is closed by a ball 26 and cap 28 welded or otherwise secured in place after the cell 10 has been filled with an activating electrolytic solution (not shown), as is well known to those skilled in the art.

The cell 10 fabricated according to conventional practice further includes an electrode assembly comprising a cathode 30 in casing 12 and an anode 32 separated from the cathode 30 by separator material 34. The electrode assembly shown is of a spirally wound or "jellyroll" configuration. The cathode 30 is typically fabricated by sheeting a cathode active material onto an expanded metal foil (not shown) and the anode 32 is made by laminating battery grade anode active material onto a metal conductor grid (not shown). The separator 34 is provided between the anode and the cathode and it typically comprises a nonwoven glass fiber hydrocarbon or fluorocarbon polymer. The two electrodes and separator are wound together in a spiral or jellyroll type formation and placed inside the casing 12. Typically, the jellyroll electrode assembly rests on an insulation plate 36 contacting the end wall 16. This prevents the wound anode-cathode assembly from telescoping downwardly.

An insulating plastic cover 38 having the shape of a circular plate rests on the upper edges of the separator material 34. An electrical lead 40 is fitted through an opening 42 in the insulating cover 38 with one end in electrical contact with the cathode 30 and the other end extending to conductor 20 mounted in glass seal 22. Finally, anode 32 includes at least one terminal or contact connection such as tab 44 extending out from the anode conductor (not shown) embedded in the anode active material and welded to the side wall 14 in a case-negative configuration, as is well known to those skilled in the art.

While this structure lends itself well to automated manufacturing, it does not allow for any mechanical stabilization of the electrode assembly other than those performed at the top of the assembly prior to sealing the casing 12. As shown in FIG. 2, under high shock and vibration conditions, forces are generated that influence the electrode assembly to move inside the cell casing in response to these forces. As shown in FIG. 2, in the cell constructed according to conventional practice, if electrode connection, i.e., tab 44 is provided at only one end of the electrode assembly, when the shock and vibration forces are directed towards that end, the assembly travels along the axis of force to place the electrode connection 44 under a compressive load condition. Typically, the strength of the electrode connection 44 is limited to tensile loading situations. Under a compressive load, the connection 44 is likely to buckle. A change in the shock and vibration forces in the reverse direction returns the electrode assembly to its original position with the electrode connection 44 again subjection to tension forces. Continuous repetition of this back and forth movement eventually results in metal fatigue and failure of the electrode connection 44 and consequently failure of the cell.

It should be understood that in conventional practice, there may be more than one electrode connection 44 extending between the electrode assembly and the casing. The point being, however, that conventional manufacturing practice only allows for electrode connections adjacent one end of the electrode assembly which construction is inadequate at such time as the cell is subject to compressive shock and vibration forces.

Figure 3:
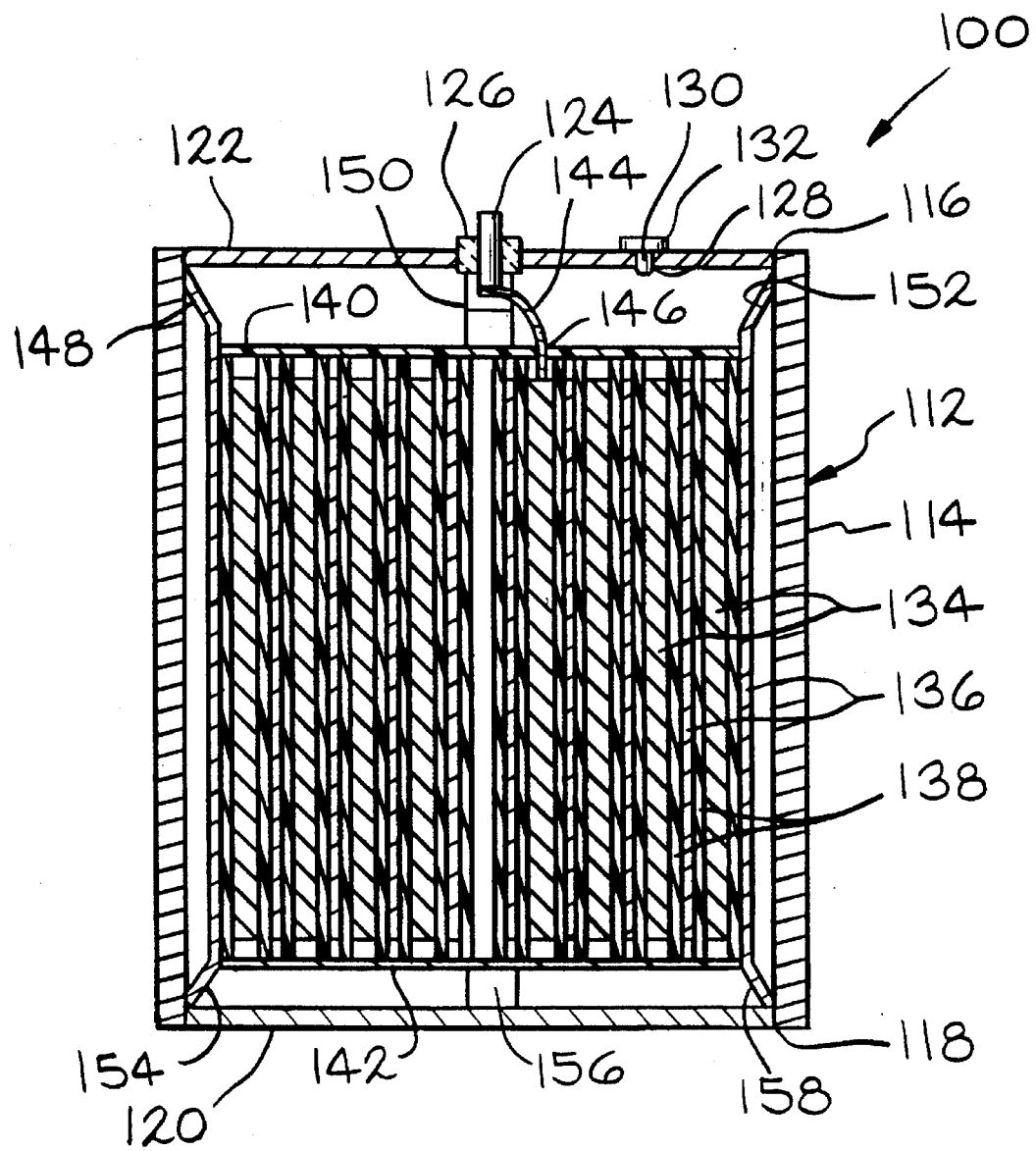
FIG. 3 is an elevational, cross-sectional view of an electrochemical cell 100 according to the present invention.
Figure 4:
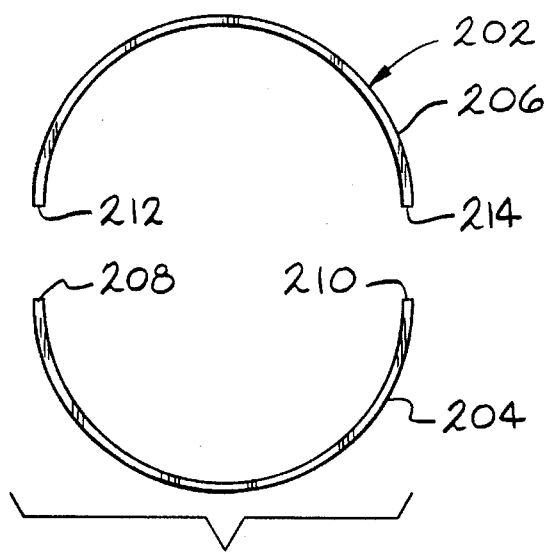
FIG. 4 is a separated, end view of another embodiment of casing 202 formed from U-shaped portions 204 and 206 according to the present invention.

Referring now to FIG. 3, there is shown one embodiment of an electrochemical cell 100 according to the present invention. In that respect, the electrochemical cell 100 includes a hollow casing 112 generally in the shape of a cylindrical side wall 114 having respective upper and lower open ends 116 and 118. Casing 112 is of metal such as stainless steel. A bottom wall 120 also made of metal, such as a stainless steel disc, is welded in the lower open end 118 of the casing 112 to close this end. Casing 112 and the bottom wall 120 being conductive and electrically connected provide one terminal or contact for making electrical connection between the cell 100 and its load. A lid or cover 122 also made of a metal such as stainless steel is welded in the upper open end 116 of the casing 112. The other electrical terminal or contact is provided by a conductor or pin 124 extending from within the cell 100 and through casing 112, in particular through lid 122. Pin 124 is insulated electrically from the metal lid 122 by an insulator and seal structure 126. Preferably, pin 124 and seal 126 are of a corrosion resistant pin-glass combination such as molybdenum and Ta23 glass. An electrolyte fill opening 128 is provided in lid 122 and is closed by a ball 130 and cap 132 welded or otherwise secured in place after the casing 112 has been filled with an activating electrolytic solution (not shown).

The electrochemical cell 100 of the present invention further includes an electrode assembly comprising a cathode 134 in casing and an anode 136 separated from the cathode 134 by separator material 138. The electrode assembly shown is of a spirally wound configuration and the cathode 134 is fabricated by sheeting a cathode active material onto an expanded metal foil (not shown). The anode 136 is made by laminating battery grade anode active material onto a metal conductor grid (not shown). The separator 138 is provided between the anode 136 and cathode 134 and can comprise a nonwoven glass fiber hydrocarbon or fluorocarbon polymer. During cell fabrication, the two electrodes and separator paper are wound together in the spiral or jellyroll type electrode assembly formation shown. An insulating, non-conductive cover 140 having the shape of a circular plate is secured to the upper edges of the separator 138 while a similarly constructed non-conductive cover 142 is secured to the lower edges of the separator 138. The spindly wound electrode assembly is then placed inside the casing 112 and an electrical lead 144 is fitted through an opening 146 in the insulating cover 140 with one end in electrical contact with the cathode 134. The other end of lead 144 is connected to conductor 124 mounted in the glass seal 126 when the lid 122 is secured in the upper open end 116. The casing 112 is completely closed when the bottom wall 120 is secured in the lower open end 118. In addition to their insulating function, covers 140 and 142 help prevent telescoping of the contained electrode assembly during use of the cell 100 and particularly when the cell is subjected to stock and vibration forces.

As clearly shown in FIG. 3, the wound electrode assembly configuration includes a plurality of terminal or contact connections provided at both the upper and lower ends thereof. These contact connections preferably extend from the anode 136 and they are connected to the inner surface of the side wall 114 prior to the bottom wall 120 and lid 122 being secured in the respective upper and lower open ends 118 and 116. In that respect, there are shown electrical connection tabs 148, 150 and 152 extending from the upper end of anode 136 and welded or otherwise secured to the inner surface of the side wall 114 adjacent to the upper casing opening 116 in a case negative configuration. Similarly, electrical connection tabs 154, 156 and 158 extend from the lower end of the anode 136 and they too are secured by welding and the like to the inner surface of the side wall 114 adjacent to the lower casing opening 118 in the case-negative configuration. It should be understood that while each tab group 148 to 152 and 154 to 158 is shown comprising three tabs connecting between the respective upper and lower ends of the anode 136, this is only representative and not limiting. In practice, there are a multiplicity of upper and lower tabs such that movement of the electrode assembly inside the casing 112 is prevented.

The tabs 148 to 158 shown are particularly adapted to prevent movement of the cell assembly along and about the longitudinal axis of the casing 112 at such time as the casing is subjected to shock and vibration forces. For example, if a shock or vibration force is directed against the upper end of the casing 112, tabs 148 to 152 will be under compression force while tabs 154 to 158 experience tension forces. The tabs are constructed so that they are capable of withstanding tension forces, but they typically are not able to withstand compression forces. Without the lower tabs 154 to 158, such a force directed towards the upper end of casing 112 will cause the cell assembly to move towards the upper cover 122, as is the case with the conventional cell construction shown in FIG. 2. However, in the electrochemical cell 100 of the present invention, the electrode assembly does not experience such movement due to tabs 154 to 158. Likewise, the cell electrode assembly does not move along the casing 112 in response to a force directed against the lower end thereof due to the tensioning of the upper tabs 148 to 152.

Thus the manufacturing step of securing the tabs between the inner surface of the side wall 114 and the electrode assembly along and about the axis of anticipated shock and vibration forces is facilitated by the opposed open ends 116 and 118 of the casing 112. After the tabs 148 to 158 are secured to the side wall 114, the previously described bottom wall 120 and lid 122 are welded in place to close the casing. Such an improvement in preventing movement of the electrode assembly inside the casing 112 subjected to shock and vibration forces is not possible with the conventional deep drawn can casing 10 shown in FIGS. 1 and 2.

Figure 5:
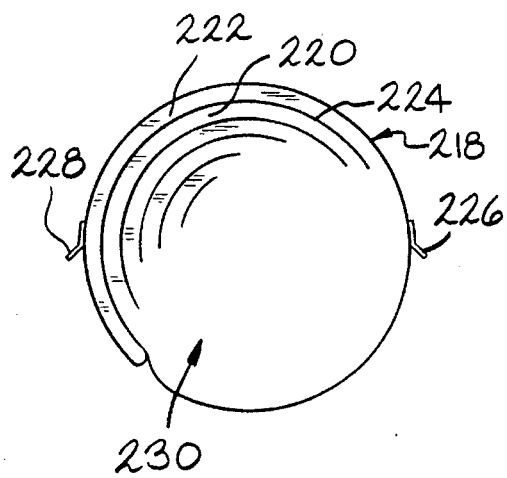
FIG. 5 is an elevational, end view of a spirally wound electrode assembly 218 useful with the casing 202 shown in FIG. 4.
Figure 6:
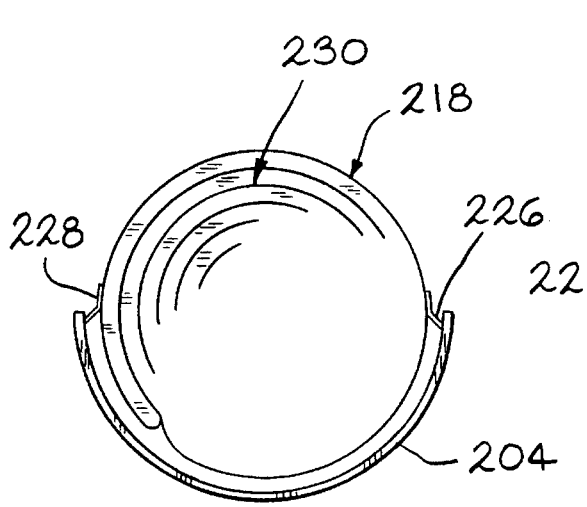
FIG. 6 is an elevational, end view of the electrode assembly 218 shown in FIG. 5 nested in the U-shaped portion 204 of the casing 202 shown in FIG. 4.
Figure 7:
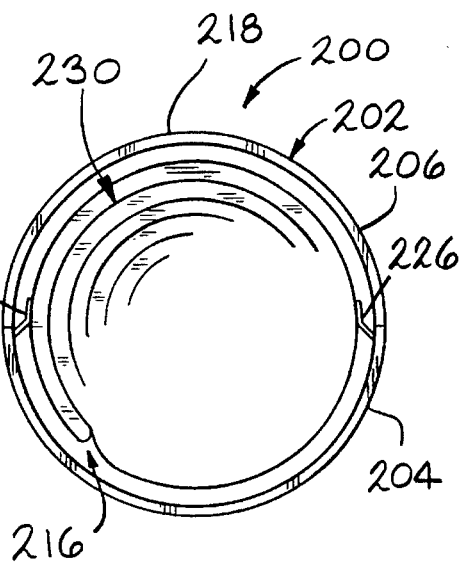
FIG. 7 is an elevational, end view of the electrode assembly 218 shown in FIG. 5 housed inside the casing 202 shown in FIG. 4.

FIGS. 4 to 7 show another preferred embodiment of an electrochemical cell 200 according to the present invention. As particularly shown in FIG. 4, the cell includes a hollow casing 202 formed of two U-shaped portions 204 and 206 which are intended to be joined (FIG. 7) along their respective lengthwise edges 208, 210 and 212, 214 to provide a cylinder. With the U-shaped portions 204 and 206 joined, the cylinder is similar to the embodiment of the present invention shown and described with respect to FIG. 3 having openings at each of its ends (only open end 216 is shown in FIG. 7). Casing portions 204 and 206 are of metal such as stainless steel.

As shown in FIG. 5, an electrode assembly 218 comprising a cathode 220 and an anode 222 separated from the cathode 220 by separator material 224 is would into a spirally wound configuration. The electrode assembly 218 is similar to that shown and described with respect to FIG. 3 except that electrical connection tabs 226 and 228 are additionally provided at an intermediate position extending from the electrode assembly 218 between its ends (only one end 230 of the electrode assembly is shown in FIGS. 5 to 7). In the case of the electrode assembly having a case-negative configuration, the tabs 226 and 228 are connected to the metal anode conductor grid (not shown). It should be obvious to those skilled in the art that there may be a plurality of intermediate electrical connection tabs positioned axially along the length of the electrode assembly 218 between its ends.

As shown in FIG. 6, this embodiment of the present invention is fabricated with the electrode assembly 218 first nested in one of the U-shaped portions 204 and the intermediate tabs 226 and 228 are secured to the inner surface thereof by welding. The other U-shaped portion 206 is joined to the first U-shaped portion 204 by abutting the lengthwise edges 208 to 212 and 210 to 214 and then welding along these edges. Cell fabrication now proceeds according to that previously described in detail with respect to the embodiment shown in FIG. 3. In that respect, additional electrical connection tabs (not shown), similar to tabs 148 to 158, are provided at each end of the electrode assembly. These tabs are secured by welding to the inner surface of the side wall of the U-shaped portions 204 and 206 adjacent to the open ends. A conductive bottom wall (not shown), similar to bottom wall 120, is then welded in one of the open ends. A lid (not shown), similar to lid 122 and including a conductor, an insulator and seal structure and an electrolyte fill opening having a ball and cap, is welded or otherwise secured in the opposite open ends of the casing. Of course, the ball and cap are only provided after the activating electrolyte solution is filled into the casing 202 through the fill opening in the lid.

Tabs 226 and 228 are provided in addition to the tabs secured adjacent to each of the ends of the electrode assembly 218 to further prevent movement of the cell assembly along and about various axes of anticipated shock and vibration forces in addition to the longitudinal axis of the casing. For example, if a shock or vibration force is directed against the side of the casing proximate tab 226, tab 226 will be under compression force while tab 228 will experience tension force. As previously described with respect to tabs 148 to 158, the tabs are constructed so that they are capable of withstanding tension forces, but they typically are not capable of withstanding compression forces. Without tab 228, such a force will cause the electrode assembly 218 to move towards the inner surface of the side wall proximate tab 226. However, in this embodiment of the present invention, the electrode assembly 218 does not experience such movement due to the opposed tab 228.

As is obvious to those skilled in the art, not only can there by provided a plurality of electrical connection tabs extending axially along the length of the electrode assembly in line with the tabs 226 and 228, but additionally, it is contemplated by the scope of the present invention that electrical connection tabs can be provided extending from various annular positions on the electrode assembly intermediate its ends. To facilitate these additional annular tabs, the cylindrical casing can be fabricated from a multiplicity of segments of lesser annular extent than the U-shaped portions 204 and 206.

As before, the embodiment of the electrochemical cell shown in FIGS. 4 to 7 and described with respect to a case-negative configuration can be provided in a case-positive configuration without limiting the present invention.

It is therefore apparent that the present invention accomplishes its objectives. It is, however, intended that the foregoing description be only representative of the present invention, the scope of which is to be defined only by the hereinafter appended claims.

What is claimed is:

1. An electrochemical cell, which comprises:
   a. a casing having at least a first opening leading therein;
   b. an electrode assembly comprising a positive electrode and a negative electrode housed in an electrochemical relationship inside the casing;
   c. tab means electrically connecting one of the positive and negative electrodes to a first cell terminal, wherein there are a sufficient number of tab means to prevent the electrode assembly from moving inside the casing; and
   d. closure means supporting a conductor means and provided to close the first opening in the casing with the conductor means being electrically insulated from the casing, and wherein the conductor means is electrically connected to the other of the positive and negative electrodes to serve as the other positive and negative cell terminal.

2. The electrochemical cell of claim 1 wherein the tab means prevent the electrode assembly from moving along and about at least one axis of anticipated shock and vibration forces.

3. The electrochemical cell of claim 1 wherein the tab means connect between the one positive and negative electrode and the first cell terminal and wherein the first cell terminal is disposed adjacent to opposed ends of an axis of anticipated shock and vibration forces.

4. The electrochemical cell of claim 1 wherein there are a sufficient number of tab means to prevent the electrode assembly from moving along and about a plurality of axes of anticipated shock and vibration forces.

5. The electrochemical cell of claim 1 wherein the first cell terminal is electrically connected to the casing.

6. The electrochemical cell of claim 1 wherein the casing has a second opening and wherein one of the first and second openings is provided adjacent to respective opposed ends of the electrode assembly connected to the first cell terminal disposed adjacent to the first and second openings, and wherein the second opening is closed by a second closure means mounted therein.

7. The electrochemical cell of claim 1 wherein the casing has a cylindrical shape extending along and about at least one axis of anticipated shock and vibration forces with a second opening leading therein, and wherein one of the first and second openings is provided adjacent to respective opposed portions of the axis, and wherein the second opening is closed by a second closure means mounted therein.

8. An electrochemical cell, which comprises:
   a. a casing serving as one of a positive and a negative cell terminal, the casing having at least a first opening leading therein;
   b. an electrode assembly comprising a positive electrode and a negative electrode disposed in an electrochemical relationship and housed inside the casing;
   c. tab means electrically connecting one of the positive and negative electrodes to the casing along and about at least one axis of anticipated shock and vibration forces to prevent the electrode assembly from moving inside the casing; and
   d. closure means supporting a conductor means and mounted in the first opening to there close the casing, wherein the conductor means is electrically insulated from the casing and is electrically connected to the other of the positive and negative electrodes to serve as the other of the positive and negative cell terminals.

9. The electrochemical cell of claim 8 wherein the tab means connect between the one positive and negative electrode and the first cell terminal and wherein the first cell terminal is disposed adjacent to opposed portions of the at least one axis of anticipated shock and vibration forces.

10. The electrochemical cell of claim 8 wherein the casing has a second opening and wherein one of the first and second openings is provided adjacent to respective opposed portions of the at least one axis of anticipated shock and vibration forces with opposed ends of the electrode assembly connected by the tab means to the casing adjacent to the first and second openings, and wherein the second opening is closed by a second closure means mounted therein.

11. The electrochemical cell of claim 10 wherein the second closure means is electrically connected to the casing.

12. The electrochemical cell of claim 8 wherein the casing has a second opening and wherein one of the first and second openings is provided adjacent to respective opposed portions of the at least one axis of anticipated shock and vibration forces with opposed ends of the electrode assembly connected by the tab means to the casing adjacent to the first and second openings, and wherein the second opening is closed by a second closure means mounted therein.

13. A method of preventing movement of an electrode assembly inside a closed casing being subjected to shock and vibration forces, which comprises:
   a. providing the casing having at least a first opening leading therein and the electrode assembly comprising a positive electrode and a negative electrode disposed in an electrochemical relationship housed inside the casing;
   b. preventing the electrode assembly from moving along and about at least one axis of anticipated shock and vibration forces by electrically connecting a sufficient number of tab means between one of the positive and negative electrodes of the electrode assembly and a first electrode terminal disposed adjacent to opposed portions of the at least one axis of anticipated shock and vibration forces; and c. closing the casing by mounting a closure means supporting a conductor means in the first opening with the conductor means being electrically insulated from the casing and electrically connected to the other of the positive and negative electrodes to serve as the other of the positive and negative cell terminals.

14. The method of claim 13 including electrically connecting the first electrode terminal to the casing.

15. The method of claim 13 including providing the casing having a second opening with one of the first and second openings provided adjacent to each of the opposed portions of the at least one axis of anticipated shock and vibration forces and further including connecting a plurality of tab means between the opposed ends of the electrode assembly and the casing adjacent to the first and second openings and wherein with the casing experiencing shock and vibration forces, the plurality of tab means preventing the electrode assembly from moving inside the casing with the second opening being closed by a second closure means mounted therein.

16. The method of claim 13 including providing the casing having a cylindrical shape extending along and about the at least one axis of anticipated shock and vibration forces with a second opening leading therein and wherein providing one of the first and second openings adjacent to opposed portions of the axis, the second opening being closed by a second closure means mounted therein.

17. The method of claim 14 including connecting the second closure means to the casing.

* * * * *